US006984031B2

(12) United States Patent
Bailey et al.

(10) Patent No.: US 6,984,031 B2
(45) Date of Patent: Jan. 10, 2006

(54) METHOD FOR MAKING MULTI-COLOR INK RESERVOIRS FOR INK JET PRINTERS

(75) Inventors: Thomas Allen Bailey, Lexington, KY (US); Jeffery James Buchanan, Lexington, KY (US); Johnnie A. Coffey, Winchester, KY (US); Brian Dale Cook, Nicholasville, KY (US); David Emerson Greer, Lexington, KY (US); Ganesh Vinayak Phatak, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/063,796

(22) Filed: Feb. 23, 2005

(65) Prior Publication Data

US 2005/0185037 A1 Aug. 25, 2005

Related U.S. Application Data

(62) Division of application No. 10/299,933, filed on Nov. 9, 2002, now Pat. No. 6,893,120.

(51) Int. Cl.
*B41J 2/175* (2006.01)
*B29C 45/14* (2006.01)

(52) U.S. Cl. ........................................ 347/86; 264/516

(58) Field of Classification Search ............ 347/85–87; 216/46; 264/512, 516, 251, 263; 399/111, 399/262

See application file for complete search history.

(56) References Cited

U.S. PATENT DOCUMENTS

| | | | | |
|---|---|---|---|---|
| 3,987,144 | A | 10/1976 | Nichold | |
| 4,278,417 | A | 7/1981 | Wilds et al. | |
| 4,771,295 | A | 9/1988 | Baker et al. | |
| 4,812,859 | A | 3/1989 | Chan et al. | |
| 4,860,047 | A | 8/1989 | Pirwitz | |
| 5,497,178 | A | 3/1996 | DeFosse et al. | |
| 5,576,750 | A | 11/1996 | Brandon et al. | |
| 5,659,345 | A | 8/1997 | Altendorf | |
| 5,742,311 | A | 4/1998 | Koitabashi et al. | |
| 5,926,195 | A | 7/1999 | Domhoff et al. | |
| 6,003,983 | A | 12/1999 | Lowry et al. | |
| 6,183,075 | B1 * | 2/2001 | Sasaki | 347/86 |
| 6,260,961 | B1 | 7/2001 | Seu et al. | |
| 6,325,493 | B1 | 12/2001 | Yamaguchi | |

(Continued)

FOREIGN PATENT DOCUMENTS

EP 0 88 893 A2 7/1999

*Primary Examiner*—K. Feggins
(74) *Attorney, Agent, or Firm*—David LaRose

(57) ABSTRACT

Multi-compartmentalized ink cartridges for ink jet printers and improved methods for making the ink cartridges. The multi-compartmentalized ink cartridge includes a molded, open-topped body having an interior cavity and a printhead surface area opposite the interior cavity. A divider wall is integrally molded with the molded body structure and disposed in the interior cavity to provide at least three segregated ink chambers. The divider wall includes a first wall section and a second wall section attached substantially perpendicular to the first wall section. At least first, second, third molded ink flow paths connect each of the at least three segregated ink chambers with the printhead surface area. The second and third ink flow paths are oriented relative to their corresponding ink chambers for molding with a mold insert tool so that the cartridge body does not require a separately attached member to close mold insert tool insertion areas in the body.

14 Claims, 10 Drawing Sheets

U.S. PATENT DOCUMENTS 6,331,054 B1 12/2001 Seu et al.
6,435,673 B1 * 8/2002 Hattori et al. ................ 347/86

* cited by examiner

METHOD FOR MAKING MULTI-COLOR INK RESERVOIRS FOR INK JET PRINTERS

FIELD OF THE INVENTION

This application is a division of application Ser. No. 10/299,933, filed Nov. 9, 2002, now U.S. Pat. No. 6,893,120.

The invention relates to ink jet printers and in particular to ink reservoir configurations for multi-color ink cartridges.

BACKGROUND OF THE INVENTION

Multi-compartmented ink cartridge bodies generally have reduced spacing requirements as compared to multiple single color ink cartridges. There are generally two types of multi-compartmentalized ink cartridges; parallel chamber ink cartridges, and ink cartridges having a T-shaped divider between the chambers. Each of the chambers is filled with a negative pressure inducing device such as a capillary foam, bladders, or lungs.

Regardless of the negative pressure inducing device, ink flow paths must be provided from the reservoir area of each chamber to the printhead. The ink flow paths to the printheads from ink cartridges having parallel chambers are quite different from the flow paths in multi-compartmentalized ink cartridges having a T-shaped divider between the chambers. Thus manufacturing techniques for each type of ink cartridge are also quite different.

As the cost of materials increases, there is a need for improved ink cartridge designs that enable use of less material and improved production techniques. There is also a need for manufacturing techniques, that enable production of ink cartridges having integral ink flow paths, and ink cartridges that can be formed with fewer process steps.

SUMMARY OF THE INVENTION

With regard to the foregoing, the invention provides multi-compartmentalized ink cartridges and improved methods for making the ink cartridges. A first embodiment of the invention provides a multi-compartmentalized ink cartridge body for an ink jet printer including a molded unitary body structure having exterior side walls and a bottom wall forming an open-topped, interior cavity, and a printhead surface area on a portion of the bottom wall opposite the interior cavity. A divider wall is integrally molded with the molded body structure and disposed in the interior cavity between the side walls to provide at least three segregated ink chambers within the interior cavity of the body. Each of the ink chambers has a chamber axis, wherein the divider wall includes a first wall section and a second wall section attached substantially perpendicular to the first wall section and each wall section is substantially parallel with at least one chamber axis. At least first, second, and third molded ink flow paths connect each of the at least three segregated ink chambers with the printhead surface area. The ink flow paths each have an ink flow axis with respect thereto. At least the second and third ink flow paths are oriented relative to their corresponding ink chambers for molding with a mold insert tool so that the cartridge body does not require a separately attached member to close mold insert tool insertion areas on one or more of the exterior side walls of the body.

In second embodiment, the invention provides a method for making a multi-compartmentalized ink cartridge body for an ink jet printer. The method includes the steps of providing a mold body for molding a unitary body structure.

The unitary structure has exterior side walls and a bottom wall forming an open-topped, interior cavity. A printhead surface area is provided on a portion of the bottom wall opposite the interior cavity. A divider wall is disposed in the interior cavity between the side walls, the divider wall having first and second wall sections providing at least three segregated ink chambers within the interior cavity of the body. Each ink chambers has a chamber axis, and at least one ink flow path connecting each of the segregated chambers with the printhead surface. A mold core is provided having first, second, and third chamber forming segments parallel with the chamber axes and a first ink flow path segment pending from the first chamber forming segment. The mold core is inserted into the mold body. The mold body is then injected with a thermoplastic material at a temperature sufficient to form the unitary body structure between the mold core and the mold body. The thermoplastic material is cooled to a temperature sufficient to form a solidified unitary body structure. Then the mold core is removed from the solidified unitary body structure to provide a multi-compartmentalized ink cartridge body, wherein openings on the exterior side walls of the cartridge body for forming the ink flow paths are avoided.

In another embodiment, the invention provides a molded unitary body structure having exterior side walls and a bottom wall forming an open-topped, interior cavity, and a printhead surface area on a portion of the bottom wall opposite the interior cavity. A divider wall is integrally molded with the molded body structure and disposed in the interior cavity between the side walls to provide at least three segregated ink chambers within the interior cavity of the body. The divider wall includes a first wall section and a second wall section attached substantially perpendicular to the first wall section, wherein each wall section is parallel with at least one chamber axis. At least first, second, third molded ink flow paths connect each of the at least three segregated ink chambers with the printhead surface area. At least the second and third ink flow paths are oriented relative to their corresponding ink chambers for molding with a mold insert tool through access ports in exterior side wall of the body structure. Injection molded plugs close the access ports in the exterior side wall of the body structure.

An important advantage of the invention is that the ink flow paths can be molded integral with a unitary cartridge body without having to attach a separate cover to access openings in an exterior wall of the ink cartridge body for use in forming the ink flow paths. The invention thus eliminates a step of fabricating and gluing a cover plate to the access openings thereby reducing manufacturing costs and increasing product yield. Multi-compartmentalized ink cartridges having separate access covers are often attached with adhesives, which may introduce contaminants into the ink.

BRIEF DESCRIPTION OF THE DRAWINGS

Further advantages of the invention will become apparent by reference to the detailed description of preferred embodiments when considered in conjunction with the drawings, wherein like reference characters designate like or similar elements throughout the several drawings as follows.

DETAILED DESCRIPTION OF THE INVENTION

Figure 1:
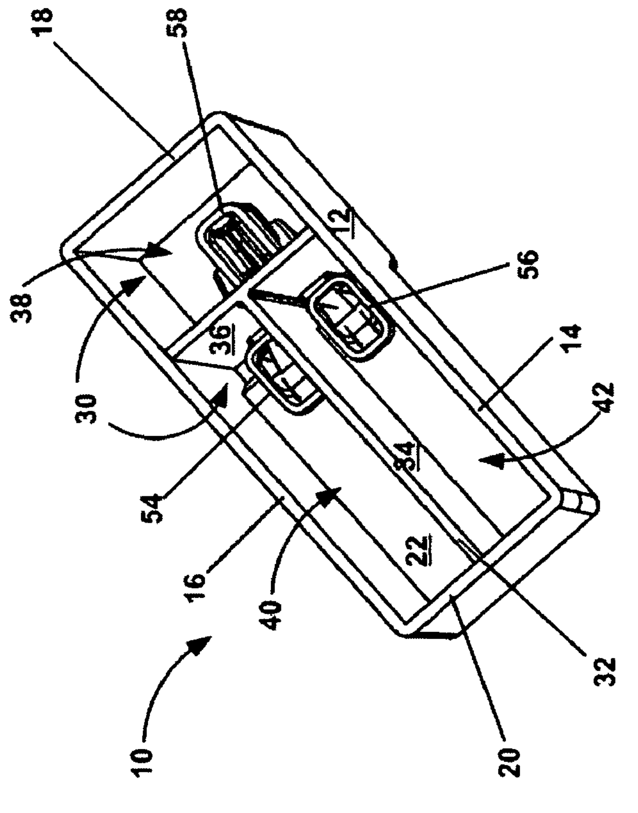
FIG. 1 is a top perspective view of an inside cavity of an ink cartridge according to a first embodiment of the invention.
Figure 2:
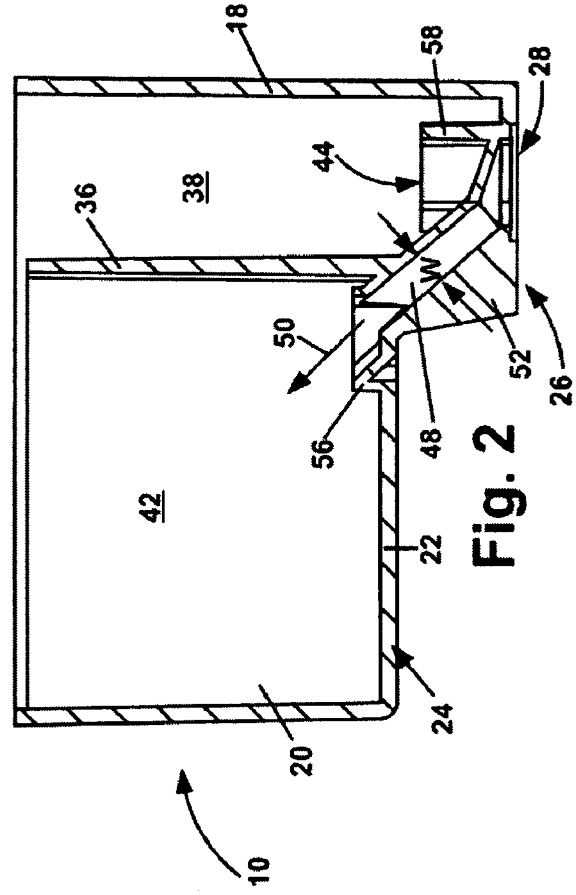
FIG. 2 is a side cross-sectional view of an ink cartridge according to the first embodiment of the invention.
Figure 3:
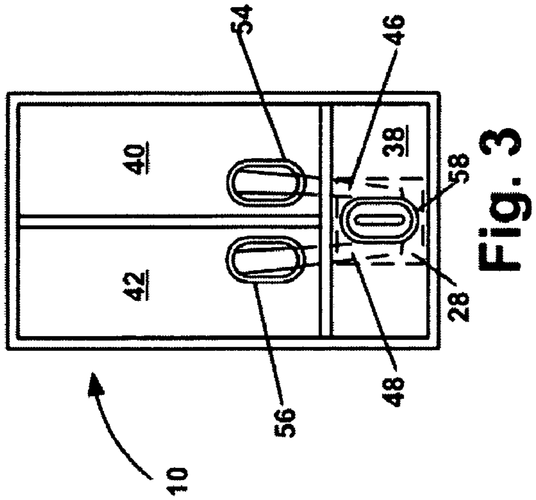
FIG. 3 is a top plan view of an ink cartridge according to the first embodiment of the invention.

With reference to FIGS. 1, 2 and 3 there is shown a multi-compartmentalized ink cartridge 10 for an ink jet printer in accordance with a first preferred embodiment of the invention. Each ink cartridge 10 includes a unitary body 12 having side walls 14 and 16, end walls 18 and 20, and a bottom wall 22. The bottom wall 22 preferably includes a reservoir section 24 and a printhead section 26 having a printhead area 28. The side walls 14 and 16, end walls 18 and 20, and bottom wall 22 form an open-topped interior cavity 30. A T-shaped divider wall 32 having a longitudinal section 34 and a transverse section 36 is integrally molded with the body 12 to provide segregated ink chambers 38, 40, and 42. The longitudinal section 34 and transverse section 36 are disposed in the interior cavity 30 so that each of the ink chambers 38, 40, and 42 has substantially the same void volume. In the alternative, one of the ink chambers 38, 40, or 42 may be provided with a larger volume for containing an ink, which is used in a greater amount than the other ink. Multiple longitudinal sections 34 may also be provided to provide additional ink chambers substantially parallel to ink chambers 40 and 42. One advantage of the invention is that multiple ink chambers may be provided without increasing the complexity of manufacture of the ink cartridges 10. It is preferred, however, to provide an ink cartridge 10 having three ink chambers.

The cartridge body 12 is preferably molded as a unitary piece in a thermoplastic molding process. The body 12 is preferably made of a polymeric material selected from the group consisting of glass-filled polybutylene terephthalate available from G.E. Plastics of Huntersville, N.C. under the trade name VALOX 855, amorphous thermoplastic polyetherimide available from G.E. Plastics under the trade name ULTEM 1010, glass-filled thermoplastic polyethylene terephthalate resin available from E. I. du Pont de Nemours and Company of Wilmington, Del. under the trade name RYNITE, syndiotactic polystyrene containing glass fiber available from Dow Chemical Company of Midland, Mich. under the trade name QUESTRA, polyphenylene ether/polystyrene alloy resin available from G.E. Plastics under the trade names NORYL SE1 and NORYL 300X and polyamide/polyphenylene ether alloy resin available from G.E. Plastics under the trade name NORYL GTX. A preferred material for making the body 12 is VALOX 855 resin.

Figure 14:
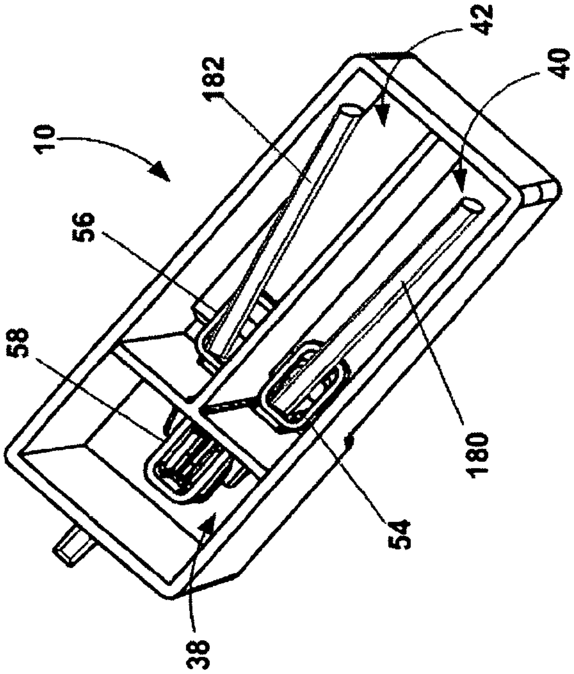
FIG. 14 is a top perspective view of an ink jet cartridge according to the first embodiment of the invention and mold tool insert for forming ink flow paths in an ink jet cartridge.

First, second, third ink flow paths 44, 46 and 48 connect each of the ink chambers 38, 40 and 42 with a printhead chip attached to the printhead area 28 of the body 12. As shown in FIG. 2, the ink flow paths 46 and 48 are oriented along an axis as represented by arrow 50, so that a mold insert can be removed from the body 12 through ink chambers 40 and 42 to form ink flow paths 46 and 48 once the thermoplastic material forming the body 12 has solidified. Likewise, ink flow path 44 can be formed by removing a mold insert through ink chamber 38, or in the alternative, a mold insert may be removed through the printhead area 28 of the body 12 to form the flow path 44. Because the mold insert is removable through ink chambers 40 and 42 along the axis represented by arrow 50, there is no need to remove a mold insert through an exterior wall of the body 12, such as side walls 14 and 16, or printhead wall 52 in the printhead section 26 of the body 12. Mold and inserts useful for making ink cartridge 10 are described below with reference to FIGS. 14 and 15.

As shown in plan view in FIG. 3, ink flow path 46 provides ink flow from reservoir 40 through filter tower 54 to printhead area 28. Likewise, ink flow path 48 provides ink flow from ink reservoir 42 through filter tower 56 to printhead area 28, and ink flow path 44 provides ink flow from ink reservoir 38 through filter tower 58 to printhead area 28.

Figure 6:
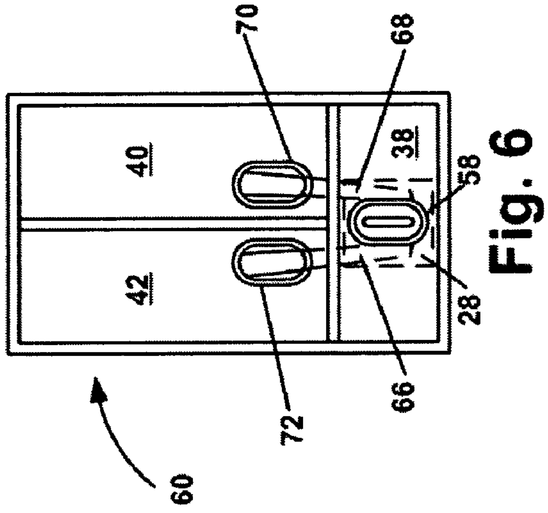
FIG. 6 is a top plan view of an ink cartridge according to the second embodiment of the invention.
Figure 5:
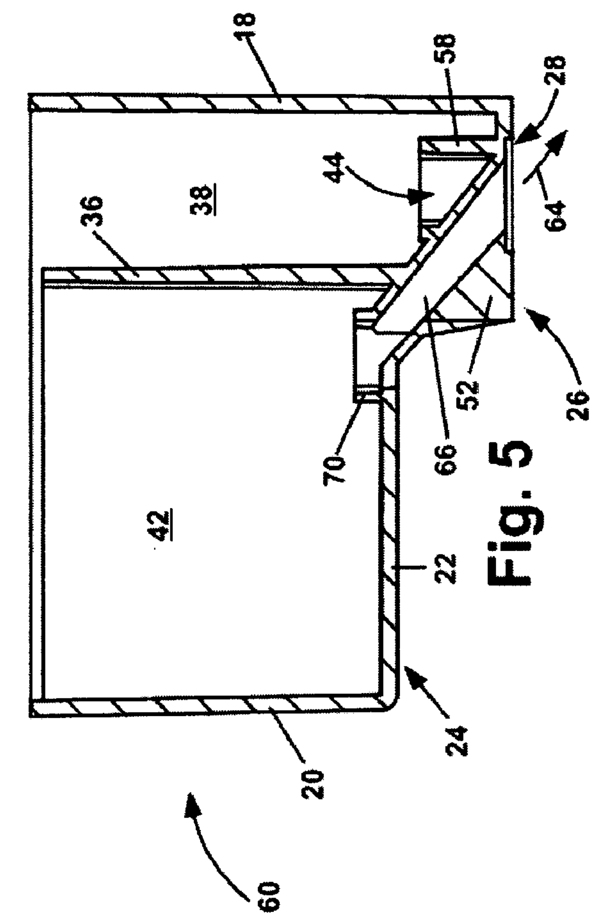
FIG. 5 is a side cross-sectional view of an ink cartridge according to the second embodiment of the invention.
Figure 4:
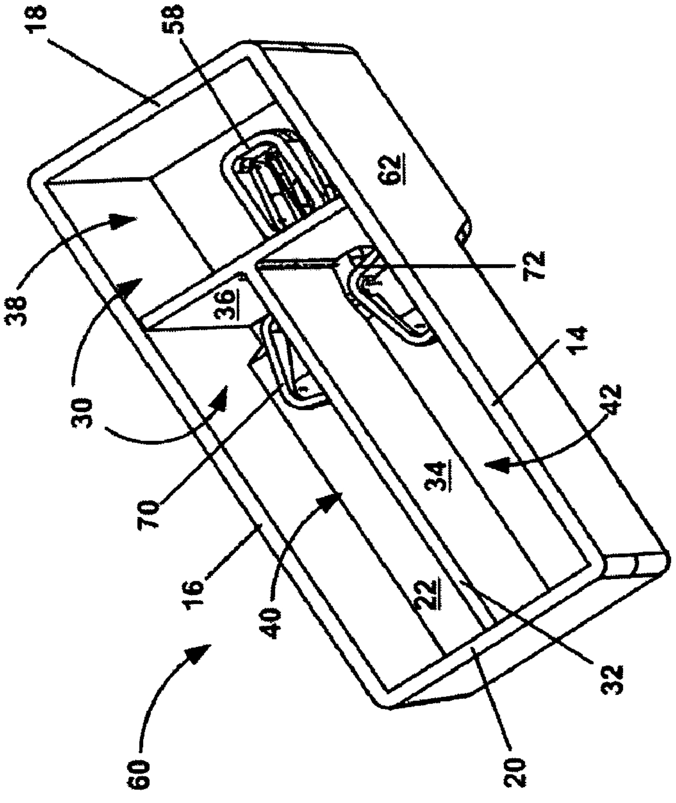
FIG. 4 is a top perspective view of an inside cavity of an ink cartridge according to a second embodiment of the invention.

A second embodiment of an ink cartridge 60 of the invention is illustrated in FIGS. 4, 5, and 6. In the second embodiment, removal of a mold insert tool through an exterior wall of the cartridge body 62 is avoided by removing the tool through the printhead area 28 of the body 62 along an axis represented by arrow 64 as shown in FIG. 5. As in the previous embodiment, filter towers 70 and 72 provide ink through ink flow paths 66 and 68 respectively to the printhead area 28. In all other respects, the unitary body 62 of this embodiment is substantially similar to the unitary body 12 of the first embodiment. The insert tool for flow path 44 may removed through the ink chamber 38 or through the printhead area 28 of the body 62. Mold and inserts useful for making ink cartridge 60 are described below with reference to FIG. 16.

Figure 9:
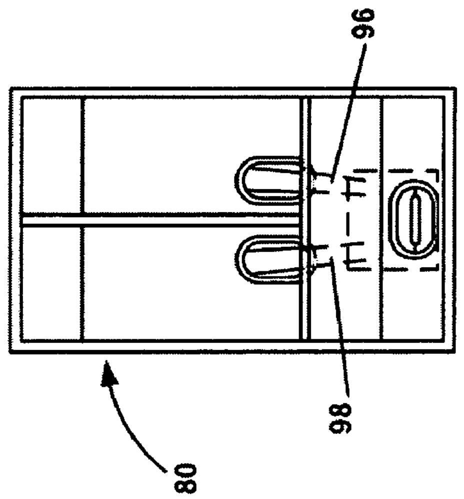
FIG. 9 is a top plan view of an ink cartridge according to the third embodiment of the invention.
Figure 8:
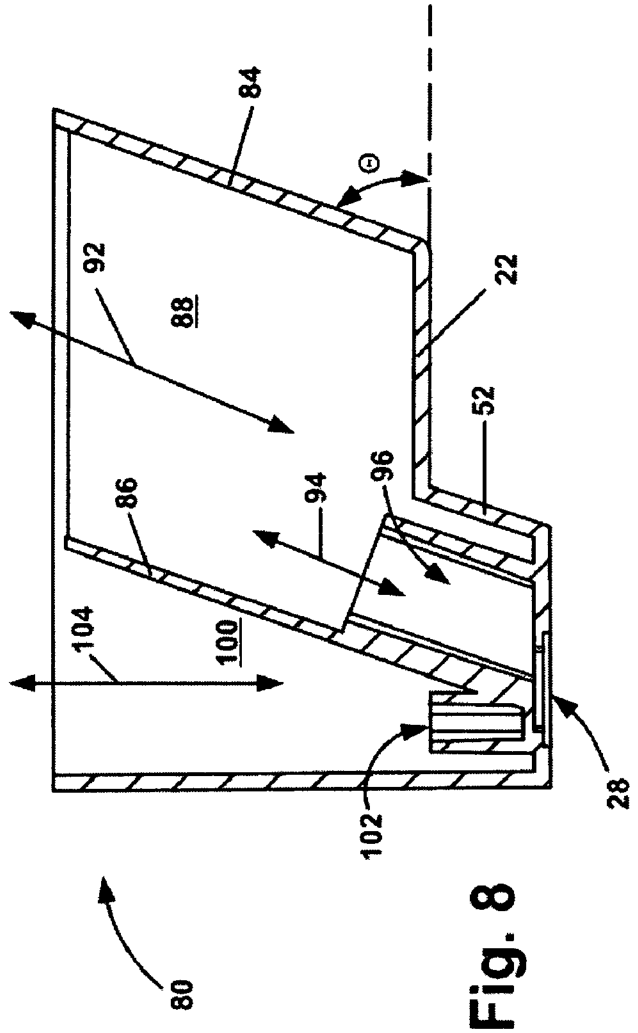
FIG. 8 is a side cross-sectional view of an ink cartridge according to the third embodiment of the invention.
Figure 7:
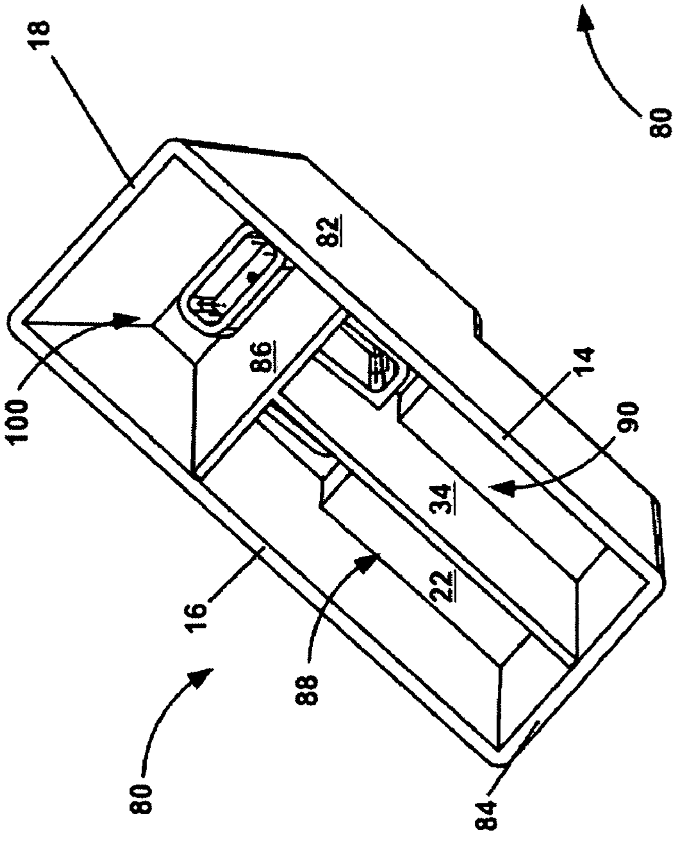
FIG. 7 is a top perspective view of an inside cavity of an ink cartridge according to a third embodiment of the invention.
Figure 17:
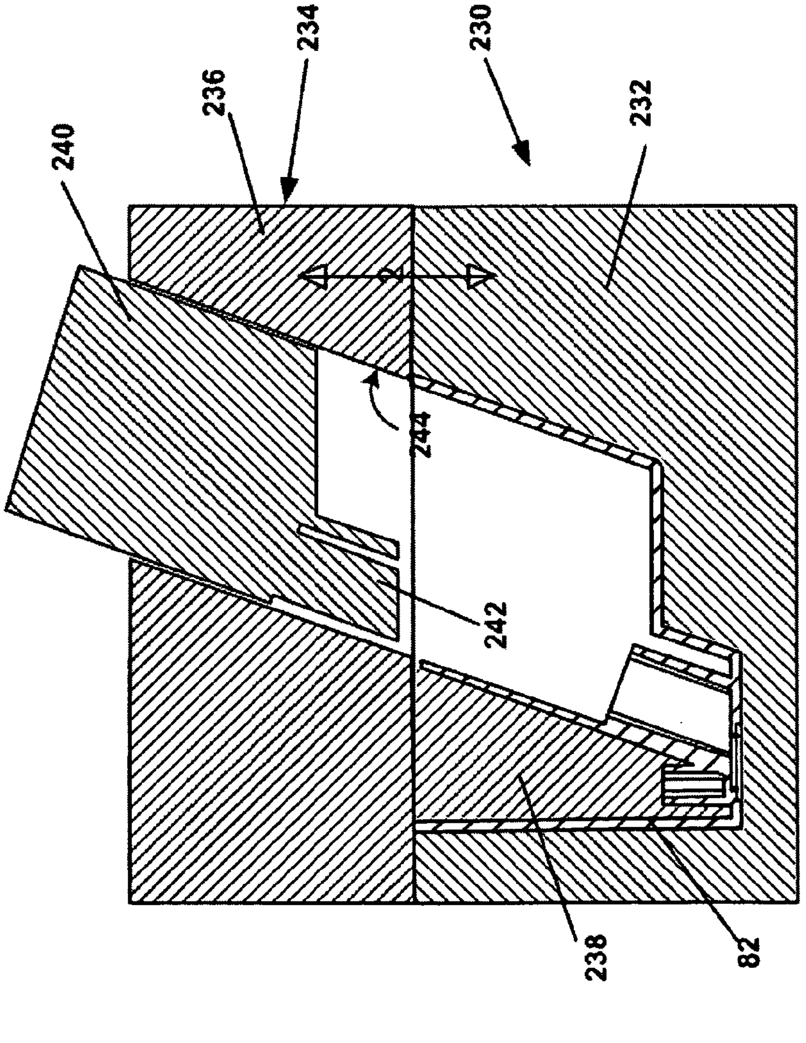
FIG. 17 is a side cross-sectional view of an ink cartridge body mold and mold insert for molding an ink cartridge according to the third embodiment of the invention.
Figure 19:
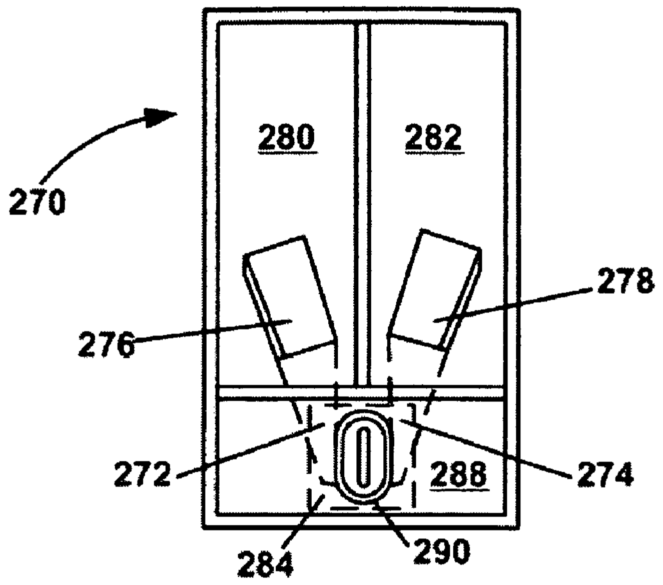
FIG. 19 is a top plan view of an ink cartridge according to a sixth embodiment of the invention.
Figure 20:
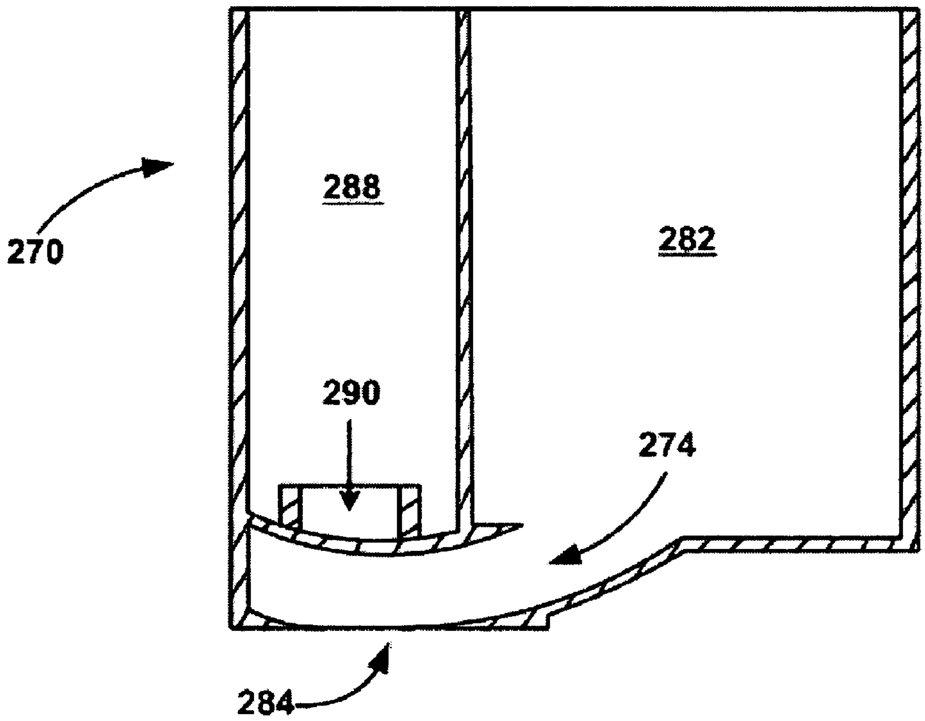
FIG. 20 is a side cross-sectional view of an ink cartridge body according to the sixth embodiment of the invention.

A third embodiment of the invention is illustrated in FIGS. 7, 8, and 9. In this embodiment, an ink cartridge 80 has a cartridge body 82 with angled end wall 84 and angled transverse section 86. The wall 84 and section 86 are preferably parallel with arrow 92 which is substantially parallel with flow axes represented by arrow 94 through the ink flow paths 96 and 98 to the printhead area 28. It will be appreciated that a single mold insert shaped to form chambers 88 and 90 substantially simultaneously with ink flow paths 96 and 98 may be provided with removal of the mold insert along the axes represented by arrow 94. Likewise ink chamber 100 and ink flow path 102 may be formed with a single insert tool shaped to provide the chamber 100 and flow path 102 with removal of the tool along an axis represented by arrow 104. Such a mold and insert for forming the chambers 88, 90, and 100 and ink flow paths 96, 98, and 102 are shown in FIG. 17 described below.

In the alternative, transverse wall section 86 may be parallel to end side wall 18 rather than being angled, provided the angle of the flow paths 96 and 98 along axes represented by arrow 94 correspond to the angle of end wall 84. The angle Θ that end side wall 84 and transverse wall section 86 make with the bottom wall 22 preferably ranges from about 65 to about 75 degrees.

Figure 11:
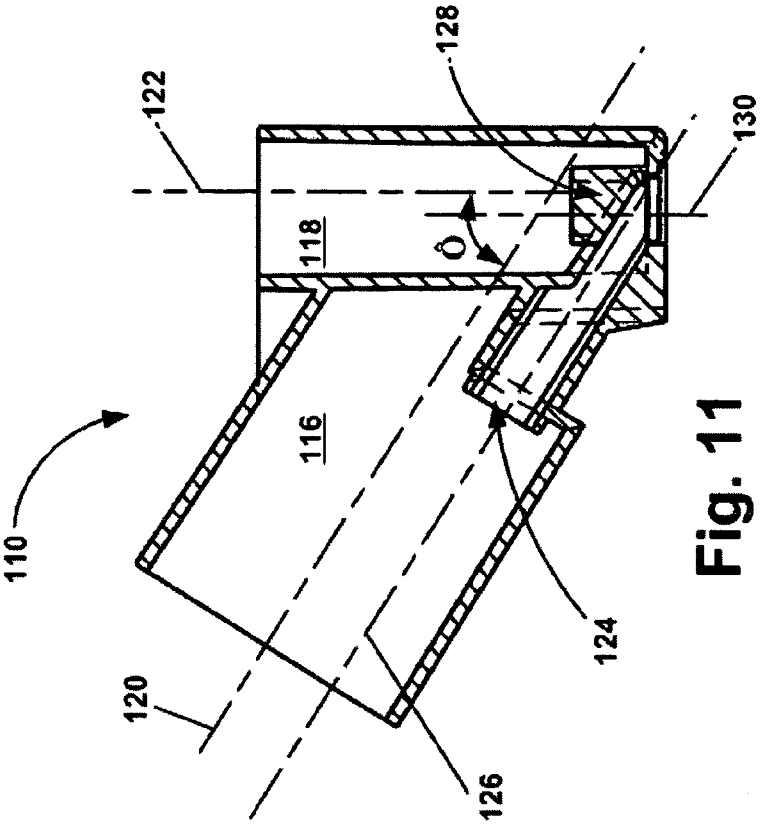
FIG. 11 is a side cross-sectional view of an ink cartridge according to the fourth embodiment of the invention.
Figure 10:
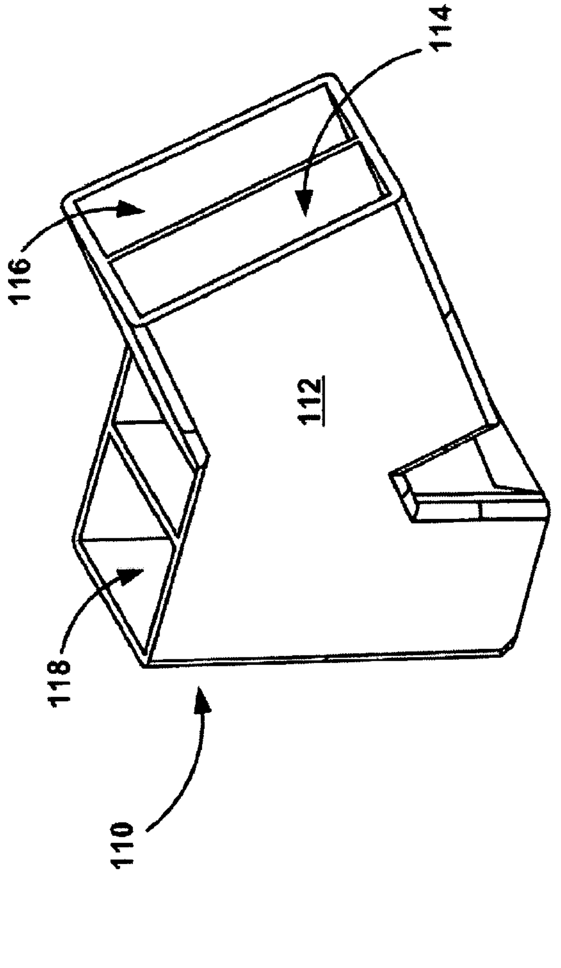
FIG. 10 is a perspective view of an ink cartridge according to a fourth embodiment of the invention.

FIGS. 10 and 11 illustrate a fourth embodiment of the invention. In this embodiment, an ink cartridge 110 has a unitary body 112 having angled ink chambers 114 and 116 with respect to ink chamber 118. Ink chambers 114 and 116 have chamber axes 120 and ink chamber 118 has a chamber axis 122. The angle Φ between axes 120 and axis 122 preferably ranges from about 55 to about 65 degrees. The ink flow paths, such as ink flow path 124 for ink chamber 116, have ink flow axes 126 which are substantially parallel to chamber axes 120. Likewise, ink flow path 128 has an axis 130 substantially parallel with chamber axis 122.

As in the cartridge 80 of the third embodiment described above, a single mold insert shaped to form chambers 114 and 116 substantially simultaneously with ink flow paths, such as path 124, may be provided with removal of the mold insert along the chamber axes 120. Likewise ink chamber 118 and ink flow path 128 may be formed with a single insert tool shaped to provide the chamber 118 and flow path 128 with removal of the tool along axis 122. Such a mold and insert are described below with reference to FIG. 18.

Figure 13:
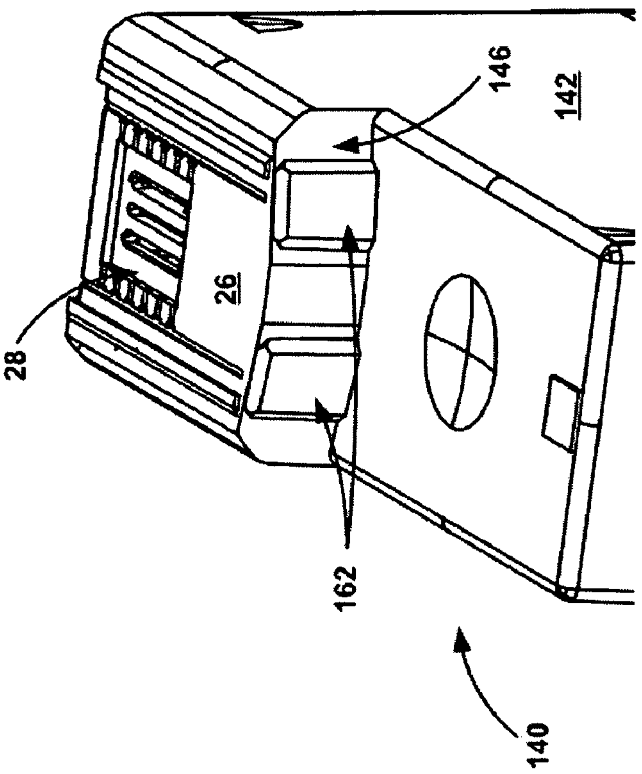
FIGS. 12 and 13 are bottom perspective views of a printhead surface side of ink cartridges according to a fifth embodiment of the invention.
Figure 12:
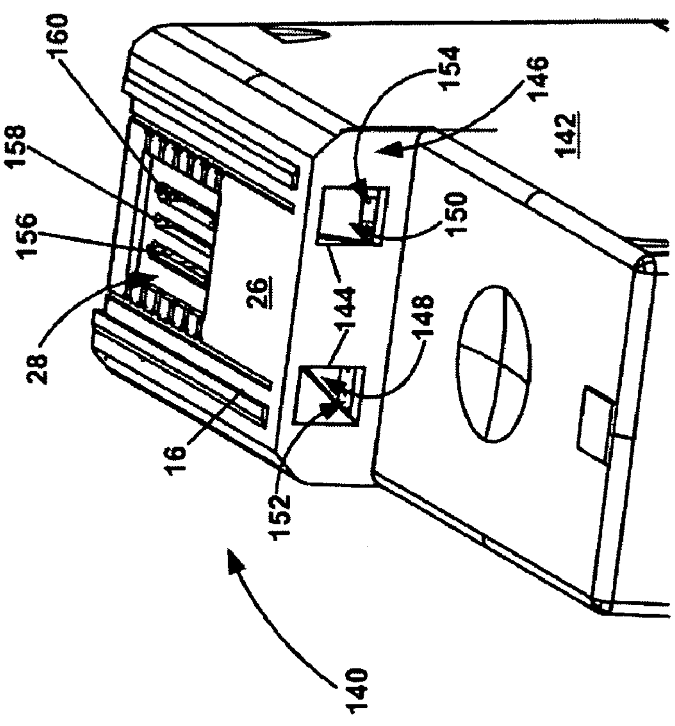

In all of the foregoing embodiments illustrated in FIGS. 1–11, no exterior wall opening is required for a mold insert to form the ink flow paths for the cartridges. Hence, no separate cover is required to close such wall openings. FIGS. 12 and 13 provide, as a fifth embodiment of the invention, an ink cartridge 140 that also does not require a separate cover to close access openings in an exterior wall of an ink cartridge body 142. The ink cartridge 140 is similar to the ink cartridges 10 and 60 shown in FIGS. 1–6 with respect to the dividing wall sections 32 and 36 and the filter towers for the ink flow paths. However, in this embodiment, access ports 144 are provided in an exterior wall 146 of the printhead section 26 of the ink cartridge body 142. The access ports 144 enable an mold insert for forming ink flow paths 148 and 150 from the corresponding ink chambers through filter towers 152 and 154, as described above, for flow of ink to the printhead area 28. In all of the embodiments described above, the printhead area 28 includes ink channels, such as ink channels 156, 158 and 160 in the cartridge body 142, for flow of ink from the ink chambers to a printhead attached in the printhead area 28 of the cartridges. Flow paths 148 and 150 provide ink flow from their corresponding ink chambers to ink channels 156 and 160, respectively.

As beforementioned, a thermoplastic material is injected into a mold to form the body 142. After the body 142 has solidified, but before the body 142 is removed from the mold, the mold inserts are removed from ink flow paths 148 and 150 and pins are inserted in filter towers 152 and 154 from the ink chamber side of the cartridge body 142 to block the flow of injection molded plastic material in ink flow paths 148 and 150. Next an injection tool is partially inserted in access ports 144 to inject molten plastic material therein to form integrally molded plugs 162 closing the access ports 144. The process described above is referred to as a "two shot" molding process, because two shots of molten plastic material are inserted in the mold for body 142. The first shot of thermoplastic material provides body 142 and the second shot of thermoplastic material provides plugs 162.

With reference now to FIGS. 14–18, illustrative molds and mold inserts for forming the ink cartridges 10, 60, 80, and 110 according to the invention will now be described. With reference to FIGS. 1–3 and FIG. 14, as set forth above, mold inserts 180 and 182 are provided to form the ink flow paths 46 and 48 through filter towers 54 and 56 for ink cartridges 10. In the case of substantially cylindrical ink flow paths 46 and 48, the inserts 180 and 182 are preferably cylindrical. However, the invention is not limited to cylindrical inserts 180 and 182 and cylindrical ink flow paths 46 and 48. A wide variety of ink flow path shapes and filter tower shapes such as oval, rectangular, and the like may be formed for all of the embodiments of the invention.

Figure 15:
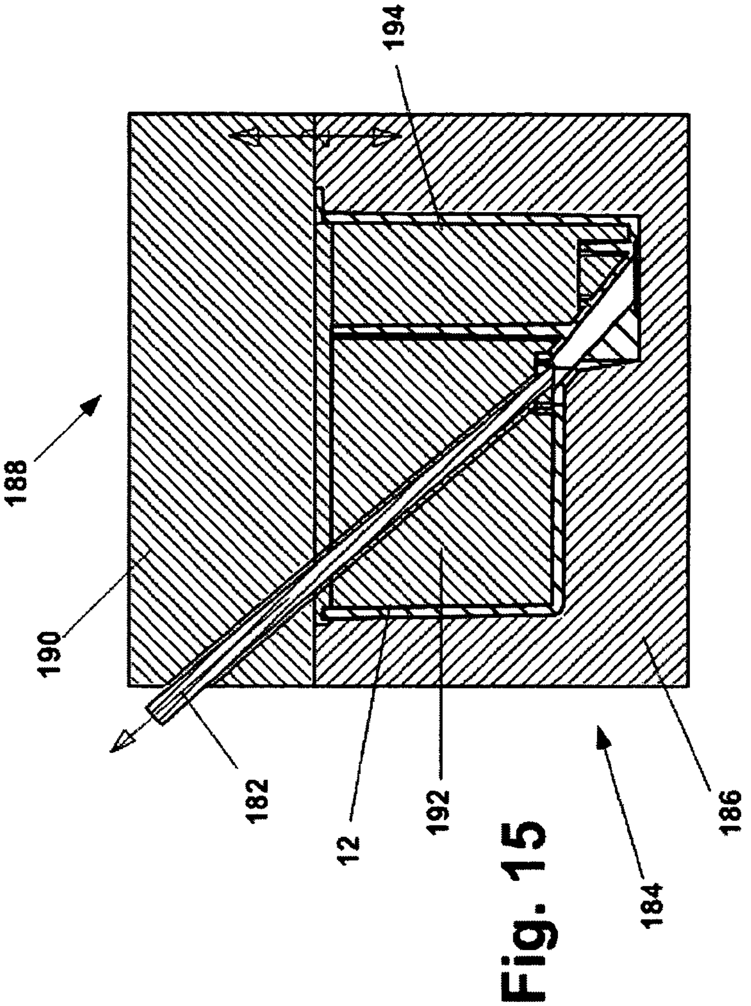
FIG. 15 is a side cross-sectional view of an ink cartridge body mold and mold insert for molding an ink cartridge according to the first embodiment of the invention.

The mold 184 for molding ink cartridges 10 is shown in cross-sectional view in FIG. 15. The mold 184 includes a bottom section 186 and a top section or mold core 188 having an upper section 190 and pending chamber forming segments such as segments 192 and 194 attached to the upper section of the mold core 188. Segment 192 forms ink chamber 42 and segment 194 forms ink chamber 38 and ink flow path 44. As described above, mold inserts such as insert 182 is used to form ink flow paths 46 and 48. Arrows 1 and 2 in FIG. 15 show the direction of movement of the mold inserts 182 and mold core 188, respectively from the solidified cartridge body 12. In this case, mold insert 182 is removed from the cartridge body 12 and mold core 188 before the mold 184 is opened along the direction of arrow 2 by moving mold core 188 and bottom section 186 away from each other. Once insert 182 is removed from the mold 184 and the mold 184 is opened, the solidified ink cartridge body 12 can be separated from the mold 184.

Figure 16:
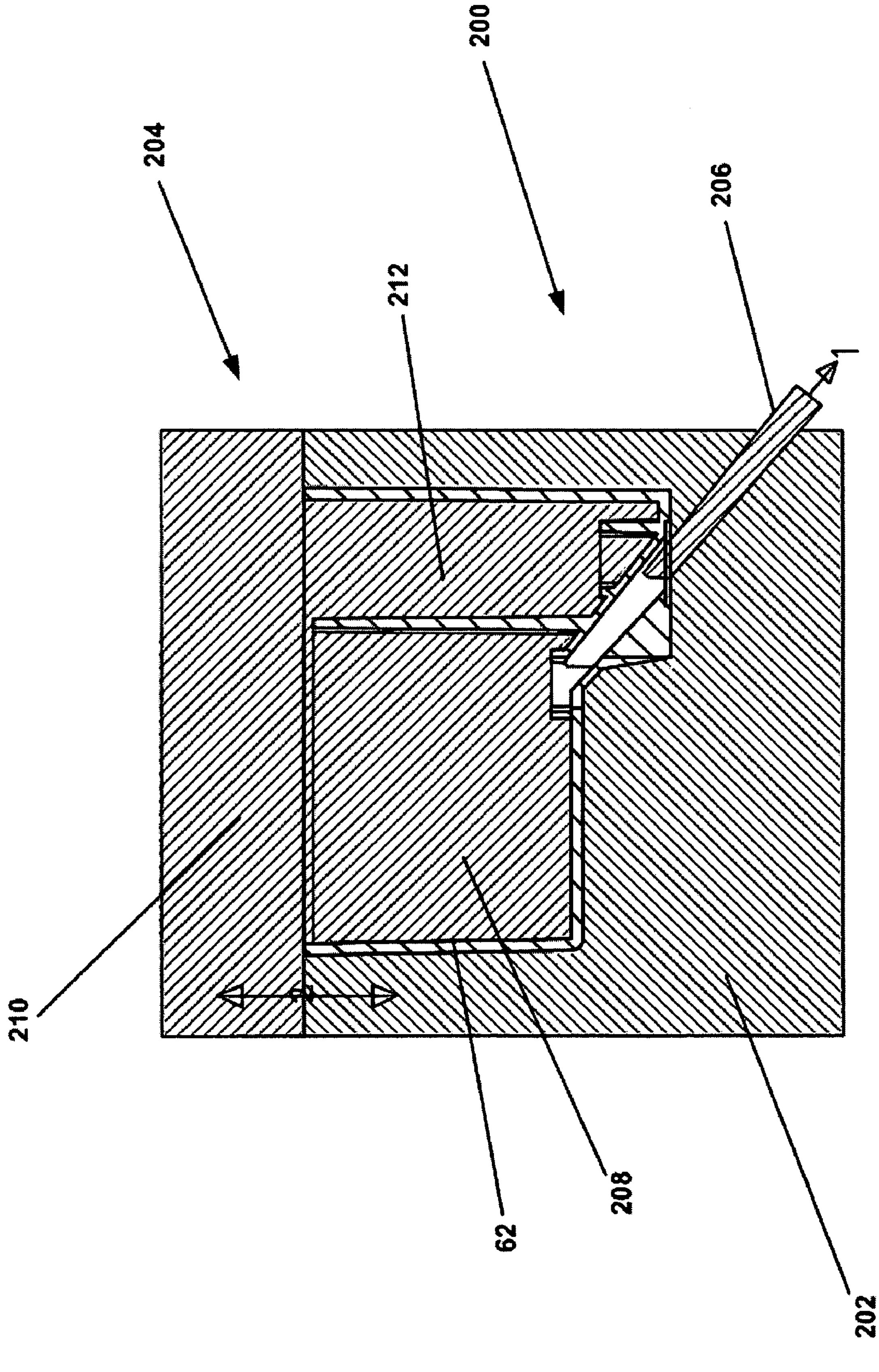
FIG. 16 is a side cross-sectional view of an ink cartridge body mold and mold insert for molding an ink cartridge according to the second embodiment of the invention.

A mold 200 having a bottom section 202 and mold core 204 for forming an ink cartridge 60 according to the second embodiment of the invention is provided in FIG. 16. In this embodiment, the ink flow paths 66 and 68 are formed by a mold insert 206 inserted from the printhead area 28 side of the ink cartridge 60. Mold segments, such as segment 208 attached to the upper section 210 of the mold core 204 form ink chambers 40 and 42 and mold segment 212 forms ink chamber 38 and ink flow path 44. Once the cartridge body 62 has solidified, the insert 206 is removed from the solidified cartridge body 62 along the direction of arrow 1, then the cartridge body 62 is removed from the mold 200 by opening the mold 200 along the direction of arrow 2.

FIG. 17 illustrates a mold 230 for forming the ink cartridges 80 according to the third embodiment of the invention. In this case, the mold 230 includes a lower section 232 and a mold core 234 provided by an upper section 236 and a pending segment 238 attached to the upper section for forming ink chamber 100 and ink flow path 102. In this case, a mold insert 240 also has a pending segment 242 for forming the ink chambers 88 and 90 and ink flow paths 96 and 98. Once, the cartridge body 82 has solidified, the mold insert 238 is preferably removed through an aperture 244 in the mold core 234 along the direction of arrow 1 before the mold 230 is opened. The mold 230 is opened by separating the upper section 236 and lower section 232 from one another along the direction of arrow 2, then the cartridge body 82 is removed from the mold 230.

Figure 18:
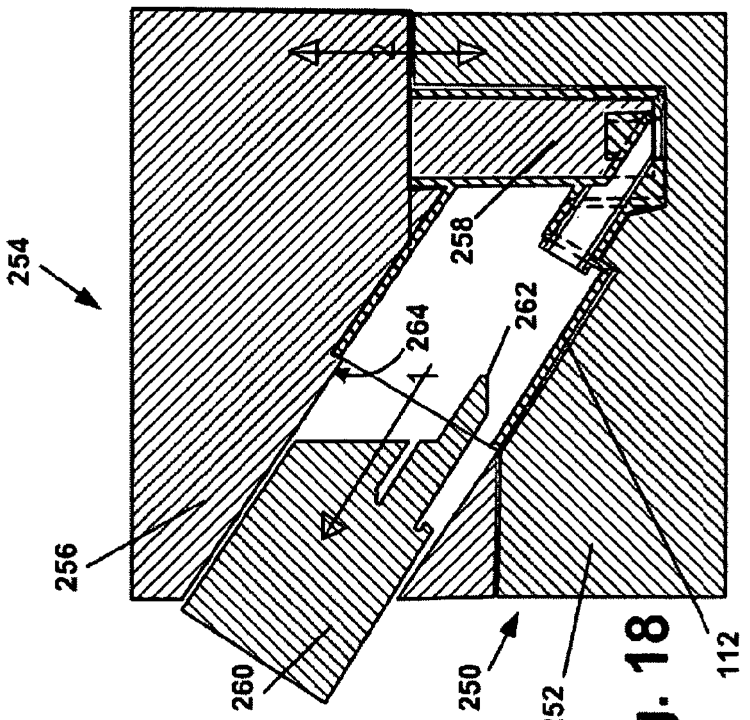
FIG. 18 is a side cross-sectional view of an ink cartridge body mold and mold insert for molding an ink cartridge according to the fourth embodiment of the invention.

FIG. 18 is an illustration of a variation on mold 230 for forming ink cartridges 110 according to the fourth embodiment of the invention. As before, mold 250 includes a lower section 252 and a mold core 254. The mold core 254 has an upper section 256 and pending segment 258 attached to the upper section for forming ink chamber 118 and ink flow path 128. A mold insert 260 having a pending segment 262 is inserted and removed through an aperture 264 in the mold core 254 and is used to form the ink chambers 114 and 116 and ink flow channels, such as channel 124, for ink cartridge 110. Once the cartridge body 112 has solidified, the mold insert 260 is removed along the direction of arrow 1 through the aperture 264 in the mold core 254 preferably before the mold 250 is opened along the direction of arrow 2, then the solidified cartridge body 112 is separated from the mold 250.

Figure 21:
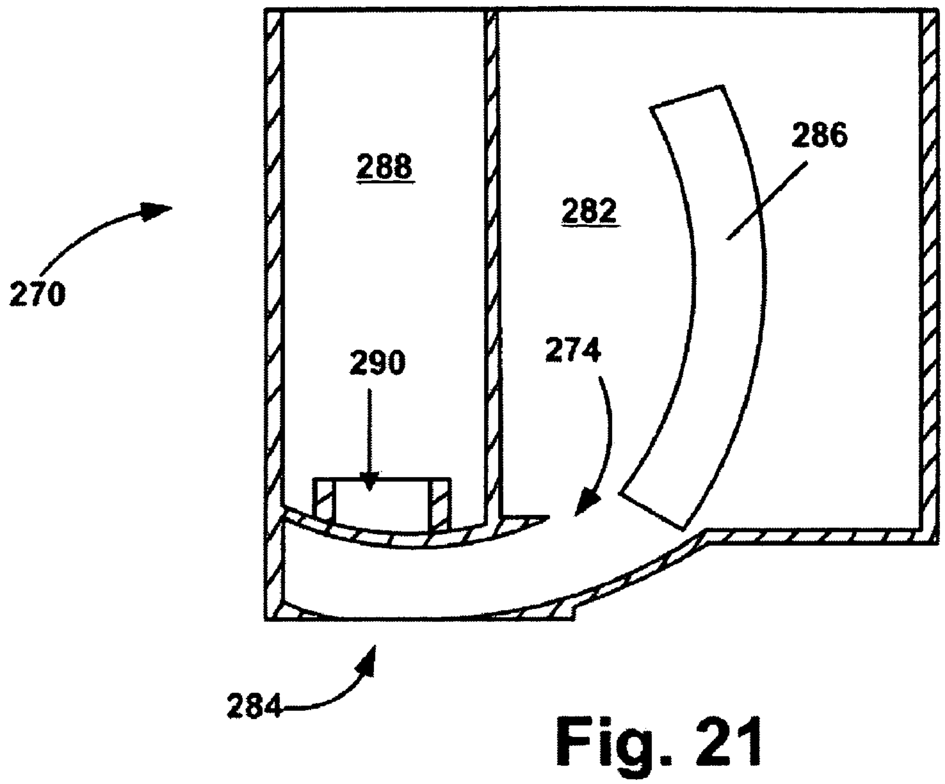
FIGS. 21 and 22 are side cross-sectional views of an ink cartridge body and mold insert tool according to the sixth embodiment of the invention.
Figure 22:
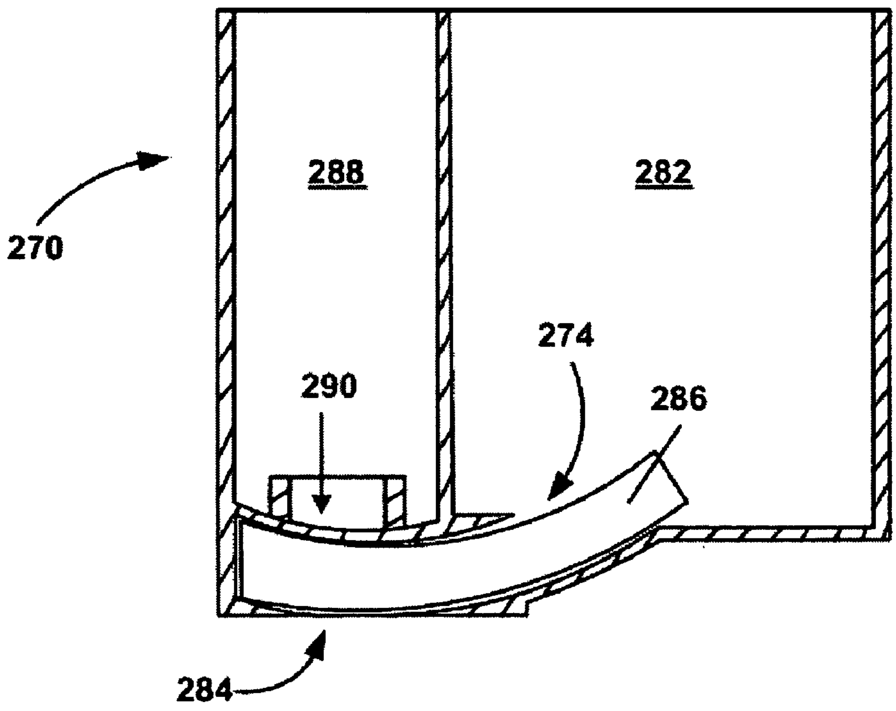

FIGS. 19–22 illustrate an alternative design of an ink cartridge 270 having curved or arcuate ink flow paths 272 and 274 from filter towers 276 and 278 in ink flow chambers 280 and 282 to the printhead area 284. The arcuate ink flow paths 272 and 274 are formed during the molding process by a mold insert 286 (FIGS. 21 and 22). In this embodiment, the ink flow paths 272 and 274 may be formed without changing the shape or size of the ink chambers 280 and 282. Ink chamber 288 and ink flow path 290 are formed generally as described above with reference to 1–3.

The mold for forming the ink cartridge 270, according to this embodiment is similar to the mold 184 (FIG. 15) with the exception that the top section or mold core also contains an arcuate opening therein for positioning the mold inserts 286 in the mold during the molding process. The mold inserts 286 are located on the core side of the tooling. During the molding process, the mold insert 286 is actuated or rotated into position (FIG. 22) for forming the ink flow paths 272 and 274. After molding the ink cartridge 270, the mold inserts 286 are retracted to a position as shown in FIG. 21 and the mold core and lower section of the mold are moved away from each other so that the ink cartridge 270 may be separated from the mold.

After the ink cartridges 10, 60, 80, 110, 140, and 270 are formed in the molds described above, the thermoplastic material forming the cartridges is cooled to solidify the material and the cartridges are removed from their respective molds. A printhead chip and corresponding flexible circuit is attached to the cartridge bodies. Next, the ink chambers may be filled with a capillary material, such as foam, and/or ink in the absence of a capillary material and a cover is attached by adhesives or thermoplastic welding to the open-topped body of the ink cartridge to provide a closed container.

It is contemplated, and will be apparent to those skilled in the art from the preceding description and the accompanying drawings, that modifications and changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A method for making a multi-compartmentalized ink cartridge body for an ink jet printer comprising the steps of:

providing a mold body for molding a unitary body structure having exterior side walls and a bottom wall forming an open-topped, interior cavity, a printhead surface area on a portion of the bottom wall opposite the interior cavity, a divider wall disposed in the interior cavity between the side walls, the divider wall having first and second wall sections providing at least three segregated ink chambers within the interior cavity of the body, the ink chambers having chamber axes, and at least one ink flow path connecting each of the segregated chambers with the printhead surface;

providing a mold core including first, second, and third chamber forming segments parallel with the chamber axes and a first ink flow path segment pending from the first chamber forming segment;

inserting the mold core into the mold body;

injecting the mold body with a thermoplastic material at a temperature sufficient to form the unitary body structure between the mold core and the mold body;

cooling the thermoplastic material to a temperature sufficient to form a solidified unitary body structure; and removing the mold core from the solidified unitary body structure to provide a multi-compartmentalized ink cartridge body, wherein openings on the exterior side walls of the cartridge body for forming the ink flow paths are avoided.

2. The method of claim 1 wherein the mold core contains second and third ink flow path segments pending from second and third chamber forming segments, respectively, whereby second and third ink flow paths are formed in the cartridge body during the injecting step, and the first, second, and third ink flow path segments are removable from the unitary body structure through the ink chambers of the solidified body.

3. The method of claim 2 wherein at least one of the wall sections of the divider wall is formed substantially parallel to ink flow axes defined by the second and third ink flow paths.

4. The method of claim 3 further comprising molding at least one of the exterior side walls of the body structure substantially parallel to the at least one wall section of the divider wall.

5. The method of claim 1 further comprising second and third mold core segments removable from the solidified unitary body structure through a printhead surface area of the solidified body for forming second and third ink flow paths in the cartridge body.

6. The method of claim 2 further comprising molding at least two of the ink chambers so that the chamber axes are substantially parallel with flow path axes defined by the second and third ink flow paths and so that the chamber axes of the at least two chambers are angled with respect to a chamber axis of a third ink chamber.

7. A method for making a multi-compartmentalized ink cartridge body for an ink jet printer comprising the steps of:

providing a mold body for molding a unitary body structure having exterior side walls and a bottom wall forming an open-topped, interior cavity, a printhead surface area on a portion of the bottom wall opposite the interior cavity, a divider wall disposed in the interior cavity between the side walls, the divider wall having first and second wall sections providing at least three segregated ink chambers within the interior cavity of the body, and at least one filter tower and ink flow path connecting each of the segregated chambers with the printhead surface;

providing a mold core including first, second, and third chamber forming segments parallel with the chamber axes and a first ink flow path segment pending from the first chamber forming segment;

inserting the mold core into the mold body;

providing an insertion tool for forming second and third ink flow paths in the body structure through access ports in an exterior wall of the body structure;

injecting the mold body with a first thermoplastic material at a temperature sufficient to form the unitary body structure between the mold core and the mold body;

cooling the thermoplastic material to a temperature sufficient to form a solidified unitary body structure;

removing the mold core from the solidified unitary body structure; inserting blocking pins in the filter towers of the second and third ink flow paths;

injecting a second thermoplastic material to close the access ports in the exterior wall of the body structure, wherein the second thermoplastic material is melt compatible with the first thermoplastic material;

and, removing the blocking pins from the filter towers of the second and third ink flow paths to provide a multi-compartmentalized ink cartridge body having integrally molded access port plugs on the exterior wall of the body structure.

8. The method of claim 7 wherein the first and second thermoplastic materials are the same.

9. A method for making a multi-compartmentalized fluid cartridge body, comprising the steps of:

molding a body structure between a mold body and a mold core, the body structure containing exterior side walls and a bottom wall forming an open-toped interior cavity and an ejection head surface area on a portion of the bottom wall opposite the interior cavity;

molding a divider wall integral with the body structure in the interior cavity thereof to provide at least two segregated fluid chambers within the interior cavity of the body structure; and molding fluid flow paths to connect each of the fluid chambers in fluid flow communication with the ejection head surface area using a flow path molding structure, whereby, after molding the flow paths and body structure, the flow path molding structure is removed from the fluid flow paths through the fluid chambers or through the ejection head surface area.

10. The method of claim 9, wherein the cartridge body is molded to contain at least three segregated fluid chambers and corresponding fluid flow paths.

11. The method of claim 9, wherein the flow path molding structure is a single mold core insert shaped to form the chambers substantially simultaneously with the fluid flow paths.

12. The method of claim 9, wherein the flow path molding structure is a mold insert tool, whereby the mold insert tool is removed through the fluid chambers after molding the flow paths and body structure.

13. The method of claim 9, wherein the flow path molding structure is a mold insert tool, whereby the mold insert tool is removed through the ejection head surface area after molding the flow paths and body structure.

14. The method of claim 9 further comprising molding the body structure and divider wall to provide at least three fluid chambers, whereby at least two of the fluid chambers are molded to have chamber axes that are substantially parallel with flow path axes of corresponding fluid flow paths for the at least two fluid chambers, wherein the at least two chambers are angled with respect to a chamber axis of a third fluid chamber.

* * * * *